INVENTOR.
PIETER C. VAN DER HAM

United States Patent Office 3,282,609
Patented Nov. 1, 1966

3,282,609
PIPE CONNECTION
Pieter Cornelis van der Ham, Grouw, Netherlands, assignor to North American Philips Company, Inc., New York, N.Y., a corporation of Delaware
Filed Dec. 17, 1964, Ser. No. 419,069
Claims priority, application Netherlands, Dec. 20, 1963, 302,334
3 Claims. (Cl. 285—7)

This invention relates to pipe connections obtained by sliding two pipe ends into one another.

Joints of this kind have little resistance against separation under external forces, such as bending forces, if the pipe ends are not slid into one another over a relatively great length. Said difficulty especially occurs if one tube or both tubes is or are made from an elastic material such as synthetic material. The connection may then readily become loose or leak due to the deformation resulting from the external load.

Pipe connections of this kind are used, for example, in securing the tubing of a vacuum cleaner in the suction nozzle of the vacuum cleaner. Such a tubing frequently terminates in a pipe of synthetic material onto which a metallic length of pipe is slipped which in turn may be inserted into the suction aperture.

According to the invention a solution to the difficulty above referred to is found by providing one tube end with at least one cam which snaps into an aperture of the other end of the tube and by surrounding the telescoped portion of the two tube ends by a ring which is connected through at least one cam to the outer end of the tube in order to make the joint resistant to external forces, more particularly bending forces. A connection is thus obtained which can readily be assembled and which, viewed in the direction of length, has only a limited length. In this construction the outer ring surrounding the end of the tube is not subjected to the external forces so that the ring is not deformed as a result thereof. A further improvement may be obtained by suitable positioning of the cams. An advantageous embodiment is therefore characterized in that the cams connecting respectively the inner end of one pipe to the end of the outer tube and the end of the outer tube to the surround ring are located in a plane of symmetry at right angles to the bending direction. It is thus ensured that the cams are pushed into the apertures with greater force if deformation through bending occurs.

In one preferred embodiment the cams are provided on the outer periphery of the inner end of the tube and on the inner periphery of the ring. The outer end of the outer tube being provided with an aperture into which snap both a cam on the inner end of the tube and a cam on the ring. The number of apertures to be formed in the outer tube is thus restricted.

It is also advantageous that the cams on the inner end of the tube and on the ring respectively are bevelled so as to fit on one another in the aperture in the outer tube. The dimensions of the cams and of the apertures are thus limited while still retaining a great strength of the cams. Furthermore assembly is facilitated.

In order that the invention may be readily carried into effect, one embodiment thereof will now be described in detail, by way of example, with reference to the accompanying diagrammatic drawing, in which.

Figure 1:
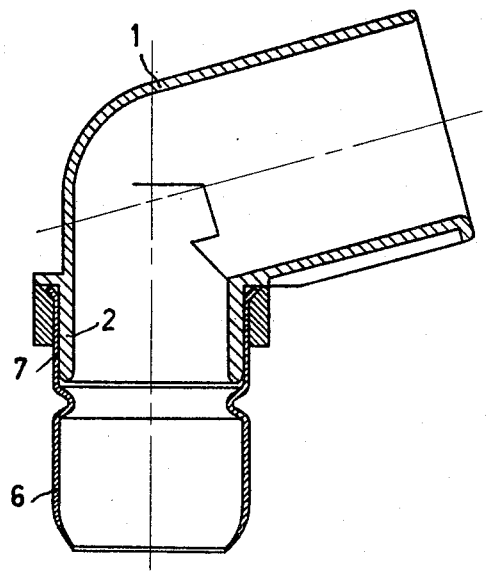
FIGURE 1 is a sectional view of a connection between a bent length of tube made of synthetic material and a length of tube made of metal.
Figure 2:
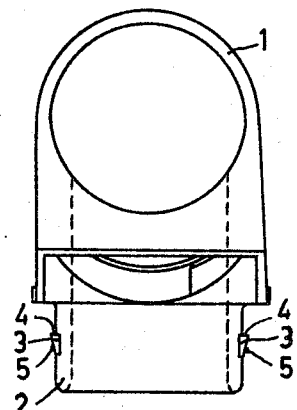
FIGURE 2 is an elevational view of the length of tube made of synthetic material.

The elbow tube 1 has a junction portion 2, provided with two cams 3 (FIG. 2) each having a surface 4 at right angles to the axis of the junction portion and a sloping surface 5.

Figure 3:
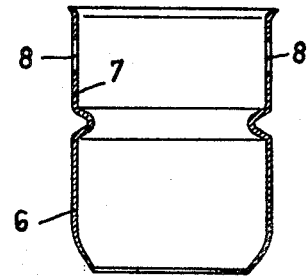
FIGURE 3 is a sectional view of the metallic length of tube to be joined thereto.
Figure 5:
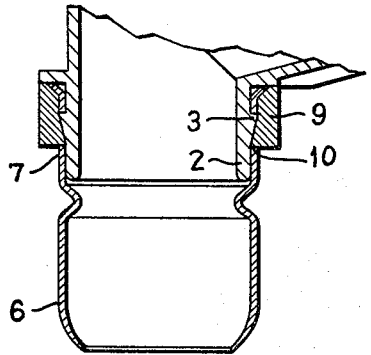
FIGURE 5 is a partial cross sectional view of the invention in assembled relation.

The tube 6 made of metal, for example, aluminium has a portion 7 which fits on the junction portion 2 of the tube 1. The metal tube has two rectangular apertures 8 in portion 7 (FIG. 3) into which fit the cams 3.

Figure 4:
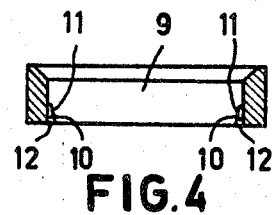
FIGURE 4 is a sectional view of a ring of synthetic material which is to be provided around the joint.

The metal tube 6 is preferably surrounded by a ring 9 of synthetic material (FIG. 4), the inner surface of the ring is provided with two cams 10 each having a flat surface 12 at right angles to the axis of the ring and a sloping surface 11. The cams 10 likewise fit into the apertures 8 of the tube 6 and the sloping surfaces 5 and 11 of the cams engage one another. In the assembled condition the cams 3 and 10 extend through the apertures 8, and a length of tube 7 is enclosed between the junction piece 2 and the ring 9. This results in a connection of the tubes 1 and 6 which is resistant to separation by external forces, more particularly bending forces, and which cannot become loose or leak due to deformation of one of assembled parts. In the example shown, the length of the junction piece 2 is about half the outer diameter thereof.

What is claimed is:

1. A pipe connection between telescoped pipe ends comprising a first pipe member having a junction portion, at least one integral cam means projecting radially outwardly from said junction portion, a second pipe member being of a relatively flexible material and having a portion telescoped over said junction portion and having at least one aperture therein for receiving said cam means, and a reinforcing ring member having at least one inwardly directed integral cam means, said ring member closely surrounding the telescoped portion of said second pipe member, said inwardly directed cam means being received in said aperture of said second pipe member to retain said reinforcing sleeve in position, both of said cam means together substantially filling said aperture, said reinforcing ring preventing deformation and release of said second pipe member upon the application of bending stresses.

2. A pipe connection according to claim 1 wherein said first pipe defines an elbow and the axes of said elbow define a plane of bending forces, each said cam means and the aperture of said second pipe are located in a plane of symmetry normal to the plane of bending forces normally acting on said connection.

3. A pipe connection according to claim 2 wherein said inwardly and outwardly projecting cam means are oppositely bevelled in said longitudinal direction for entry into a common aperture of said second pipe member, said cam means being in engagement along said bevelled surfaces.

References Cited by the Examiner
UNITED STATES PATENTS

| | | | |
|---|---|---|---|
| 922,805 | 5/1909 | Nelson | 285—319 |
| 1,029,819 | 6/1912 | Nylander | 285—88 |
| 2,245,151 | 6/1941 | Martinet | 285—7 |
| 2,901,258 | 8/1959 | Brandafi | 285—85 |

CARL W. TOMLIN, *Primary Examiner.*

R. GIANGIORGI, *Assistant Examiner.*